United States Patent [19]

Machat

[11] Patent Number: 5,080,129

[45] Date of Patent: Jan. 14, 1992

[54] PILOT OPERATED PRESSURE REDUCING VALVE

[75] Inventor: Dieter Machat, Lohr, Fed. Rep. of Germany

[73] Assignee: Mannesmann Rexroth GmbH, Lohr, Fed. Rep. of Germany

[21] Appl. No.: 484,215

[22] Filed: Feb. 26, 1990

[30] Foreign Application Priority Data

Feb. 25, 1989 [DE] Fed. Rep. of Germany ....... 3905959

[51] Int. Cl.$^5$ ............................................. G05D 16/00
[52] U.S. Cl. ................... 137/489; 137/491; 137/492
[58] Field of Search ............. 137/491, 489, 492, 492.5

[56] References Cited

U.S. PATENT DOCUMENTS

| | | | |
|---|---|---|---|
| 2,184,670 | 12/1939 | Harrington | 137/489 |
| 3,373,763 | 3/1968 | Smilges | 137/489 X |
| 3,960,170 | 6/1976 | Schuhmacher et al. | 137/491 |

OTHER PUBLICATIONS

"The Hydraulic Trainer", Mannesmann Rexrath GmbH, Jul. 1981, pp. 122-123.

Primary Examiner—Alan Cohan
Attorney, Agent, or Firm—Cushman, Darby & Cushman

[57] ABSTRACT

The present invention provides a pilot operated pressure reducing valve in which the pilot liquid (generally the pilot fluid) is taken from the low pressure side, wherein two pilot liquid connections (or conduits) from the low pressure side to the pilot valve are provided which the separate from each other. The one connection takes the pilot liquid (or fluid) from the control area of the control spool while the other connection takes the pilot liquid (or fluid) from outside the control range (or area) of the control spool. A check valve is provided to seperate said two connections and closes to the low pressure side. Thus, even for large volume flows and large pressure differentials, between the high pressure side and the low pressure side, good control- and stability characteristics are obtained.

4 Claims, 2 Drawing Sheets

PILOT OPERATED PRESSURE REDUCING VALVE

TECHNICAL FIELD

This invention relates generally to a pilot operated pressure reducing valve, and, more particulary, to a pilot operated pressure reducing valve having a pilot fluid connection (control circuit) between the low pressure side and the pilot control valve, said connection including a throttle or throttle orifice.

BACKGROUND ART

Pilot operated pressure reducing valves are well known. See for instance page 123 of the book "The Hydraulic Trainer" of Mannesmann Rexroth GmbH. Thus, it is known to branch off the pilot fluid or liquid for the pilot valve, at the output of the pressure reducing valve i.e. outside the effective area of the main or control spool. Alternatively, pilot fluid can be branched off in the area of the control egdes of the control spool, and in each case the control spool comprises a centrally located port acting as a throttle means. Via the throttle means the pilot fluid is directly supplied to the control space or chamber of the control spool. If the pilot fluid is taken from the output of the pressure reducing valve, it is necessary to limit the volume flow or stream as well as the pressure differential to values which are below the customary limits for the respective nominal sizes of the valve. Otherwise a "closing effect" of the main valve will occur, a situation which makes the main valve ineffective.

When the pilot fluid in the control range (or area) of the control spool decreases, the control volume flow changes in relatively large areas or ranges depending on the main volume flow and the pressure differentials between the inlet B and the outlet A. The tendency of change is decreasing up to about the middle of the volume flow range, and beyond, it is increasing. The decreasing tendency of change is increased with an increasing pressure differential (B A). In the falling range of the pilot volume flow, instabilities can occur and for a high pressure differential (B A) the tendency of "valve closing" occurs. In the increasing branch of volume flow the valve tends to whistle (pilot control whistling). To avoid the occurences of instabilities it is neseccery to select the input and dampening throttle (or orifice) to be relatively small. This, however, has a negative influence on the dynamic response of the valve.

It is an object of the present invention to provide a pilot operated pressure reducing valve such that it shows, in comparison with other pressure valves, good characteristics for control and stability in the entire area or range of the volume flow and pressures.

Generally, the present invention is directed to overcome one or more of the problems of the prior art.

DISCLOSURE OF INVENTION

In accordance with the present invention a pilot operated pressure reducing valve comprises: a low pressure side, a high pressure side, a first pilot fluid connection between the low pressure side and the pilot control valve, said pilot fluid connection including a throttle orifice, a second pilot fluid connection between the low pressure side and the pilot control valve, said second connection comprising a throttle orifice, wherein the low pressure connection of the first control fluid connection is provided in the control area of the control spool, wherein the low pressure connection of the second control fluid connection is outside of the control area of the control spool, and wherein the two control fluid connections are separable from each other.

Due to the combination of the two control circuits the pressure reducing valve shows a significantly improved dynamic response, when compared with the designs of the prior art.

Sudden opening movements of the main spool (for instance start of the expansion of the cylinder under load) caused by a certain application, can be carried out in shorter time because of the improved replenishing possibility of the control volume on the spring biased side of the main spool via the two control circuits. Also, the closing times of the main spool are very low, also due to the retarded closing movement of the check valve if a sudden displacement of the control volume on the spring side occurs. For that reasons, pressure drops and pressure peaks are very low when a cylinder is actuated. Comparative measurements with a significantly more complex high pressure control design (pilot volume flow supply by means of an additional flow control from the high pressure port B) have shown for the circuit or valve of the invention more favourable values.

BRIEF DESCRIPTION OF THE DRAWINGS

For a better understanding of the present invention, reference may be made to the accompanying drawings, in which.

Figure 1:
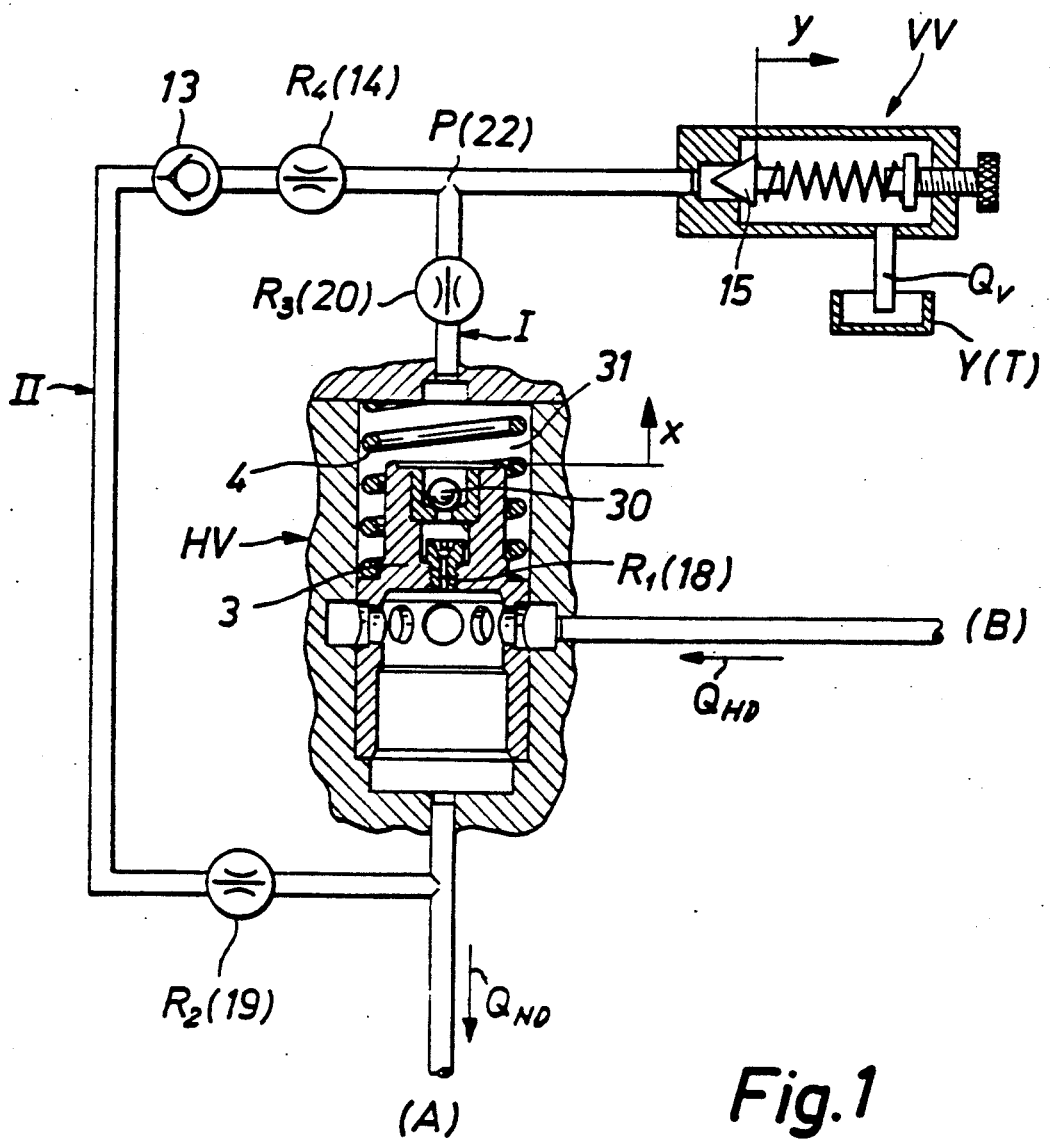
FIG. 1 shows a circuit arrangement of an embodiment of the present invention.

In accordance with FIG. 1 the pilot valve VV in the form of a pressure relief valve (short: pilot pressure relief valve VV) is supplied with the pilot volume flow (or pilot flow stream)—required for maintaining the necessary valve function—from the low pressure side (reduced pressure, port A) simultaneously via control (or pilot) circuits I and II. This supply occurs as follows:

from control circuit I via a resistance (jet) R1 (18) which is located in the center of the bottom of the control spool 3, and thus in the control range (6, 7, 8 in FIG. 2) of the control spool 3, and from control circuit II via the resistance (jet) R2 (19) arranged in the outlet port (or outlet channel) A, and thus outside of the control range of the control or main spool 3.

The resistances (jets) R3 (20) and R4 (40) provide for a dampening of the movement of the main spool 3 and they are basically without any significance as regards the control function.

In the initial position as shown, the main valve HV is open and a volume flow can unimpededly flow from the inlet port or inlet channel B via the control cross section of the main valve HV to the outlet port A. The pressure in channel A acts via the two control circuits I and II onto the pilot poppet 15 of the pilot valve VV. The pilot poppet 15 will open as soon as a pressure in port A is reached, i.e. a pressure which corresponds to the biasing force of the pilot spring 16. If this occurs a pilot volume flow will take place via said control or pilot circuits I and II. At the resistances R1 and R2 a pressure drop occurs, as a consequence of which the main or control spool 3 of the main or control valve HV will be moved against its spring 4 in the closing direction, causing a throttling of the control cross section (B A) up to such an extent where a balance occurs between the pressure in channel A and the pressure set by means of the pilot spring 16. Provided that the supply volume flow from channel B is sufficient, the pressure in channel A will—during further operations—be maintained constant independent of the volume flow to the user (user volume flow).

If the connection via the check valve 13 is open, the pilot volume flows of the two pilot circuits I and II are merged in the connecting point P, and are further guided to the pilot valve VV.

The opening position and the closing position, respectively, of the check valve 13 are determined by the pressures existing in said control circuits I and II. Said pressures can have differential values depending on the volume flow and the pressure differential at the main stage (B A) based on dynamic flow influences:

If the volume flows (B A) are very small, the local pressure at the delivery location of the control circuit I is in substance equal to the local pressure at the delivery location 2 of the control circuit II because of the low flow rate. The check valve 13 is open and the supply of the pilot valve VV with the control volume flow (volume stream) occurs simultanously by means of the two control circuits, wherein the individual volume flows (or streams) are proportionally determined by the sizes of the resistances R1 and R2 (jets), the additional resistances of the control conduits, the bias spring force of the main spool spring 4 and the flow force acting onto the main spool 3 in closing direction.

For an increasing volume flow (B A) the local pressure at the delivery location R1 of the control circuit I becomes smaller than the local pressure at the delivery location R2 of the control cicuit II. The check valve 13 remains open and a small portion of the volume flow (stream) from the control circuit II is branched off at the connecting point P to the control circuit I and flows via the control circuit I as well as the resistance R1 to the user which is connected with port A, in case that no check valve 13 is provided.

Thus, in control circuit I a reversal of the flow direction occurs. The pressure head at R1, which occurs as a consequence, acts in opening direction onto the main spool 3, i. e. against the force of the flow and has consequently an advantagous effect on the control function.

If the volume flow (B A) further increases, there will be again a reversal of the direction of flow in the control circuit I, if, based on the changed flow conditions the local pressures R1 and R2 assume again in substance the same values. The supply of the pilot valve with pilot volume flow occurs simultanously via both control circuits I and II.

If a larger increase of the volume flow (B A) occurs, or if a certain limit is passed, a limit which in turn depends on the pressure differential (B A), the local pressure at the delivery location R1 or the pilot or control circuit I becomes larger than at the delivery location R2 for the contol circuit II. As a consequence, the pressure in control circuit I will also become larger than in the control circuit II and thus the check valve 13 closes and blocks the control circuit II. Now, the supply of the pilot control valve VV occurs exclusively by means of the ocntrol circuit I and a reversal of the flow direction of the control volume flow in the control circuit II, and from said control circuit II to the user, can not occur. Otherwise, the control volume flow, and thus the control pressure acting on the spring loaded side of the main spool 3 would not be sufficient for maintaining the control function, and the main spool would be moved by the flow force so far in the closing direction until a new undefined balance position is reached. Due to the largely reduced control cross section (B A) at the main valve, the reduced pressure falls to an arbitrary value below the preset (adjusted) value. Provided said a sufficient supply volume flow (port B) exists, the volume flow in port A can only be increased to a small extent in accordance with the throttle curve of the control cross section (B A), while at the same time the user pressure (in port A) further decreases. This phenomenon is known as the closing of the main stage of the main valve.

Figure 2:
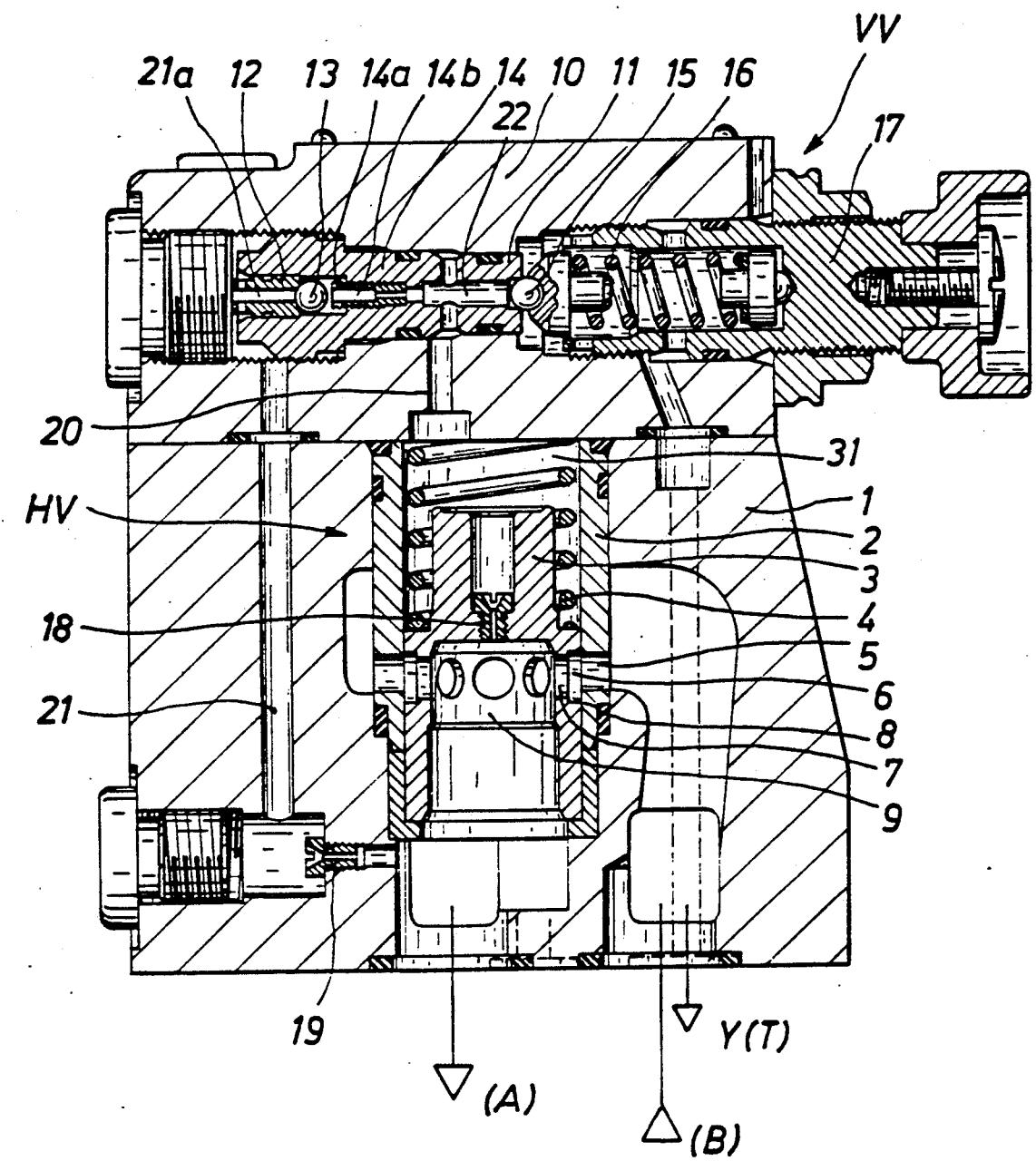
FIG. 2 shows the pressure reducing valve of FIG. 1 in a cross sectional view.

Now, refering primarily to FIG. 2, the pilot operated reducing valve of the invention will be explained in more detail. The main or control valve HV comprises a housing 1 having an inlet port or channel B and an outlet port or channel A. In the axial bore of the housing 1, a main valve insert or cartridge is located, which comprises a sleeve 2, the main or control spool 3 and the main or control spool spring 4. At the circumference of the sleeve, inlet flow bores 5 are uniformly equidistantly spaced in a single plane. The main spool 3 is axially moveably mounted in said sleeve 2 against the force exerted by spring 4. At its outer circumference, the main spool 3 is provided with a radial recess that forms an annular inlet channel. Outlet ports 7 extend from said ring channel 6 to an axially extending spool port 9, and from there to the outlet port A. The outlet flow ports 7 are uniformly spaced about the circumference and extent in a plane which is perpendicular to the axis of said spool 3.

The variable throttle cross section is formed by the opened circular sectional areas between the inlet flow ports 5 of the sleeve 2 and the control egde 8 of the main spool 3.

The pilot control valve VV comprises a housing 10. Screwed into said housing 10 is a pilot seat 11 having integrated therein a check valve 12, 13, 15. The pilot valve VV further comprises the pilot poppet 15 together with spring 16 and an adjustment screw 17. The check valve 12, 13, 14 is formed by the valve seats 12 (blocking seat) and 14 (throttle seats) and the closing element 13 (ball) located therebetween. The axial port 21a of the valve seat 12 can be interchangeably opened or blocked by means of closing element 13. The valve seat 14 is provided with a recess 14a and an axial port 14b. The recess 14a is machined into the front side of the seat surface. Thus, if the closing element 13 is located on the valve seat 14 the connection between port 21 and 22 via the axial port 21a of the valve seat 12, the reces 14a and the axial port 14b is preserved.

The main valve 2, 3, 4, is, in its initial position, open and a volume flow or stream can unimpededly flow from the channel B to channel A via the cross sections 5, 6, 7 and 9. If a user is connected to outlet port A, its resistance will cause the build-up of a pressure in outlet port A, and this pressure acts via the resistances (jets) 18 (R1), and 19 (R2), and the control conduits 20 and 21, respectively (together with check valve), and via the port 22 onto the pilot poppet 15. As soon as the biasing force of spring 16 is reached or exceeded, the pilot poppet 15 opens and a control or pilot volume flow occurs. Due to the pressure differential at the resistances 18 and 19 the main spool 3 in sleeve 2 is moved in closing direction and throttles the main control cross section by partially closing the ports 5 by means of the control egde 8 to an extent until a balance condition is reached between the pressure force acting on the main spool 3 and the force of the pilot control spring 16.

The control conduits 20 and 21 are supplied by a channel A (reduced pressure) via the resistances (jets) 18 and 19 with pilot volume flow.

The local pressures occuring at said resistances determine the position of the closing element 13; the relative value of said local pressures with respect to each other is determined by the main volume flow and the pressure differential (B A). If the local pressure in the area of the resistance 19 is smaller than in the area of the resistance 18, then the control conduit is blocked by the check valve and the higher pressure from conduit 20 moves the closing element 13 onto the blocking seat 12.

In the opposite situation, when the local pressure at resistance 19 is larger than the local pressure at resistance 18, the closing element 13 is moved to the valve seat 14. The valve seat 14 is, however, provided with the frontal recess 14a, which permits the connection to the axial port 14b. Thus, the pilot volume flow from conduit 21 can continue to flow in conduit 22 and from there to the pilot control valve VV. A small partial flow is brached off by means of conduit 20 and the resistance 18 to the user at port A. (Flow direction in line or conduit 20). The pressure head at resistance 18 caused thereby, acts in the opening sense onto the main spool 3 and has thus no negative influence on the control characteristic of the valve.

The flow of pilot fluid or liquid from the control space or chamber 31 into the spool port 9 can be blocked by incorporating a check valve 13 (FIG. 1), with which the opening effect can be increased.

In certain areas or ranges of volume flow the local pressures at 18 and 19 can reach about the same values. In this situation, the closing element will assume a floating position between the valve seats 12 and 14, and the pilot valve is supplied from both control conduits with control or pilot volume flow. The individual portions are determind by the spring force of the main spool spring 4 in relation to the respective cross sectional areas of the resistances 18 and 19, with the flow forces at the main valve or main stage also having to be considered.

By means of the two control- or pilot- or conduits 20 and 21 and the check valve 12, 13, 14 a sufficient pilot volume flow is securely granted in the entire volume flow—and pressure—range (B A). Thus, the most important requirement for a good control and stability characteristic is fulfilled.

An inadmissible decrease of the pilot volume flow based on an unfavorable dynamic pressure distribution in the outlet area of the valve (A) as well as instabilities caused thereby—including the closing effects of the valve—are precluded by the new supply of the pilot volume flow.

To sum it up, the present invention provides a pilot operated pressure reducing valve in which the pilot liquid (generally the pilot fluid) is taken from the low pressure side, wherein two pilot liquid connections (or conduits) from the low pressure side to the pilot valve are provided which are seperate from each other. The one connection takes the pilot liquid (or fluid) from the control area of the control spool while the other connection takes the pilot liquid (or fluid) from outside the control range (or area) of the control spool. A check valve is provided to separate said two connections and closes to the low pressure side. Thus, even for large volume flows and large pressure differentials, between the high pressure side and the low pressure side, good control and stability characteristics are obtained.

It should be noted that the term "fluid" as used in herein comprises any fluid, and particularly hydraulic oil.

I claim:

1. A pilot operated pressure reducing valve comprising:
    a control spool,
    a main valve adapted to receive said control spool and having a low pressure side and a high pressure side B,
    a pilot control valve,
    a first pilot control fluid connection between the low pressure side and the pilot control valve, said first pilot fluid connection including a first throttle orifice,
    a second pilot control fluid connection between the low pressure side and the pilot control valve, said second connection comprising a second throttle orifice,
    wherein the low pressure connection of the first pilot control fluid connection is provided in a control area of the control spool,
    wherein the low pressure connection of the second pilot control fluid connection is outside of the control area of the control spool, and
    wherein the first and second pilot control fluid connections are separable from each other.

2. A pilot operated pressure reducing valve as is set forth in claim 1 wherein the second pilot control fluid connection comprises a check valve which opens in the direction of the pilot valve.

3. A pilot operated pressure reducing valve of claim 1 wherein at least between the first and second throttle orifices and the pilot control valve of the first pilot control fluid connection a dampening orifice is provided.

4. A pilot operated pressure reducing valve of claim 2 wherein at least between the first and second throttle orifices and the pilot control valve of the first pilot control fluid connection a dampening orifice is provided.

* * * * *